No. 613,866. Patented Nov. 8, 1898.
W. H. PIERCE.
AUTOMATIC WEIGHING MACHINE.
(Application filed Oct. 28, 1897.)

(No Model.) 5 Sheets—Sheet 1.

WITNESSES:

INVENTOR
William H. Pierce,
BY
Chester Bradford,
ATTORNEY.

No. 613,866. Patented Nov. 8, 1898.
W. H. PIERCE.
AUTOMATIC WEIGHING MACHINE.
(Application filed Oct. 28, 1897.)
(No Model.) 5 Sheets—Sheet 3.

WITNESSES:
F. W. Woerner.
J. A. Walsh.

INVENTOR
William H. Pierce,
BY
Chester Bradford.
ATTORNEY.

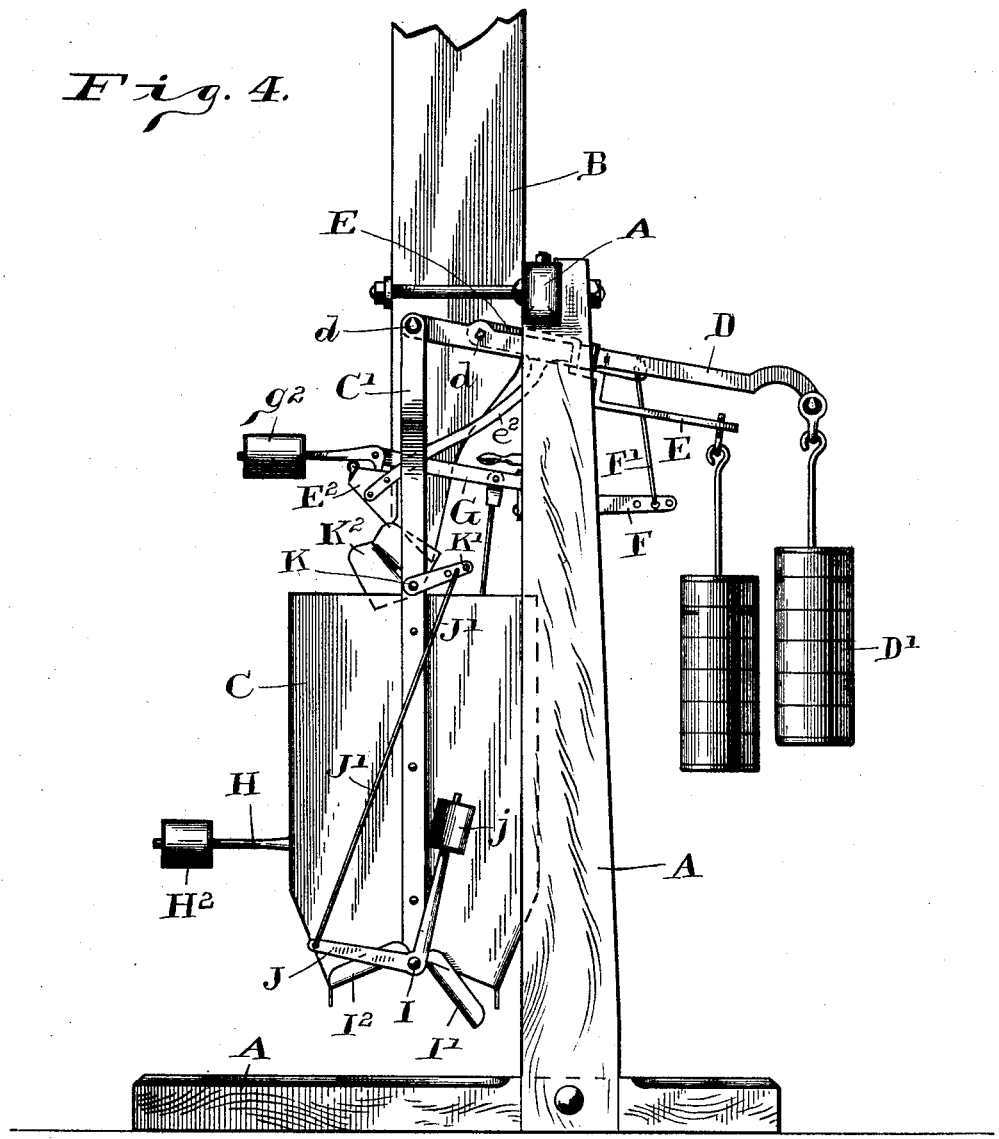

No. 613,866. Patented Nov. 8, 1898.
W. H. PIERCE.
AUTOMATIC WEIGHING MACHINE.
(Application filed Oct. 28, 1897.)
(No Model.) 5 Sheets—Sheet 5.
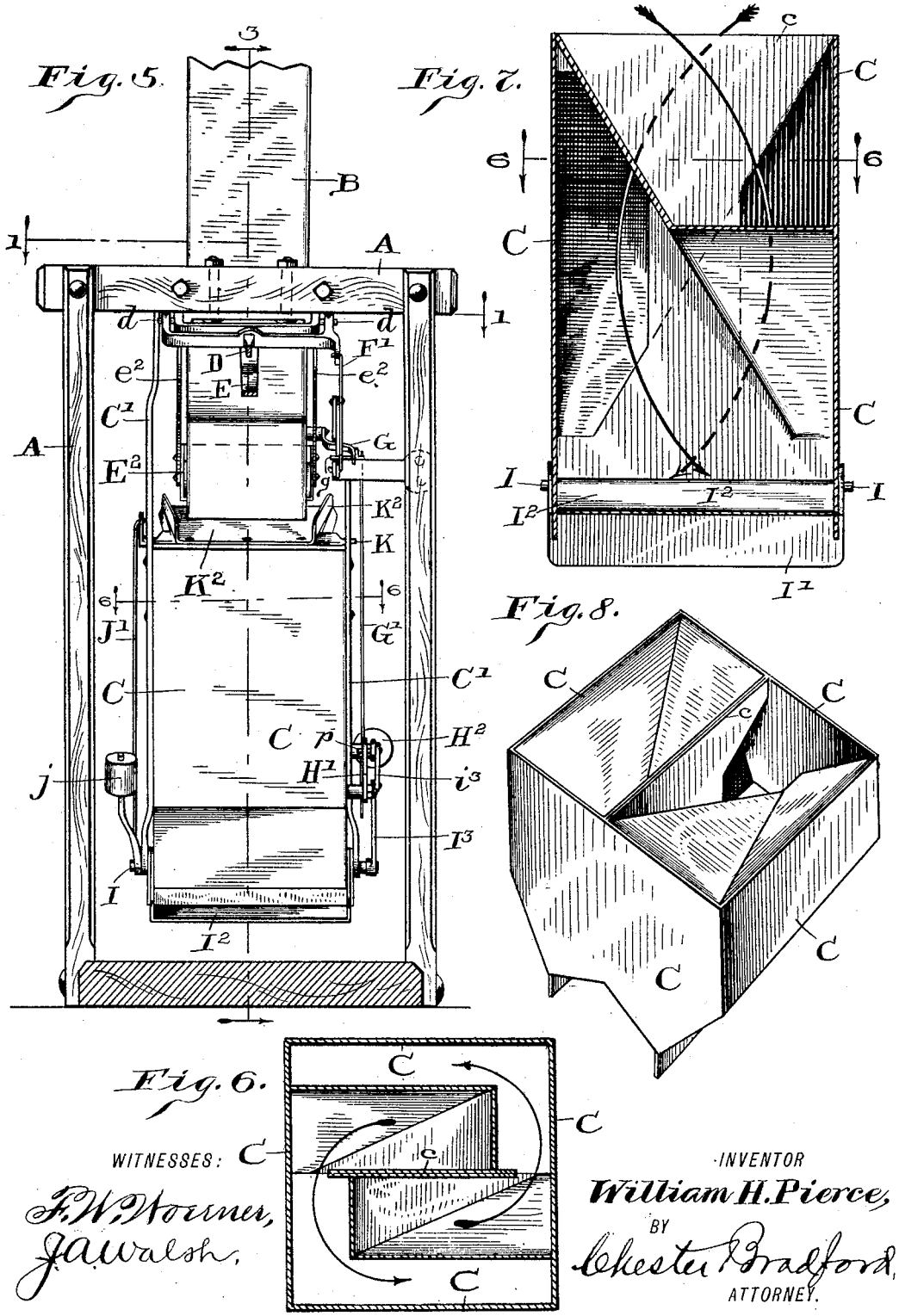
WITNESSES:
F. W. Horner,
J. A. Walsh.
INVENTOR
William H. Pierce,
BY
Chester Bradford,
ATTORNEY.
THE NORRIS PETERS CO., PHOTO-LITHO., WASHINGTON, D. C.

UNITED STATES PATENT OFFICE.

WILLIAM H. PIERCE, OF TOLONO, ILLINOIS.

AUTOMATIC WEIGHING-MACHINE.

SPECIFICATION forming part of Letters Patent No. 613,866, dated November 8, 1898.

Application filed October 28, 1897. Serial No. 656,661. (No model.)

*To all whom it may concern:*

Be it known that I, WILLIAM H. PIERCE, a citizen of the United States, residing at Tolono, in the county of Champaign and State of Illinois, have invented certain new and useful Improvements in Automatic Weighing-Machines, of which the following is a specification.

The object of my said invention is to produce an efficient, economical, and accurate automatic weighing-machine by the use of which grain or such like material may be continuously and accurately weighed.

Said invention embodies several features, among the principal of which are a certain construction of the weighing-hopper whereby the material being weighed is maintained substantially equal upon both sides of the center, a mechanism for automatically shifting a deflector whereby the material is directed into one or the other of the compartments of said hopper at the same instant the discharge-gate to the opposite compartment is opened, a duplex system of scale-beams whereby the shut-off gate is properly closed as the weighing-hopper descends, as will be hereinafter more particularly described, and a certain mechanism whereby the discharge-gate and the deflector are kept locked in proper position until the weighing-hopper has reached its extreme lower position, when they are released and permitted to shift, the shifting being effected by the weight of the material in that compartment of the hopper which has just been filled. These and other features of my said invention will now be fully described in detail, after which the novel features will be particularly pointed out in the claims.

Figure 1:
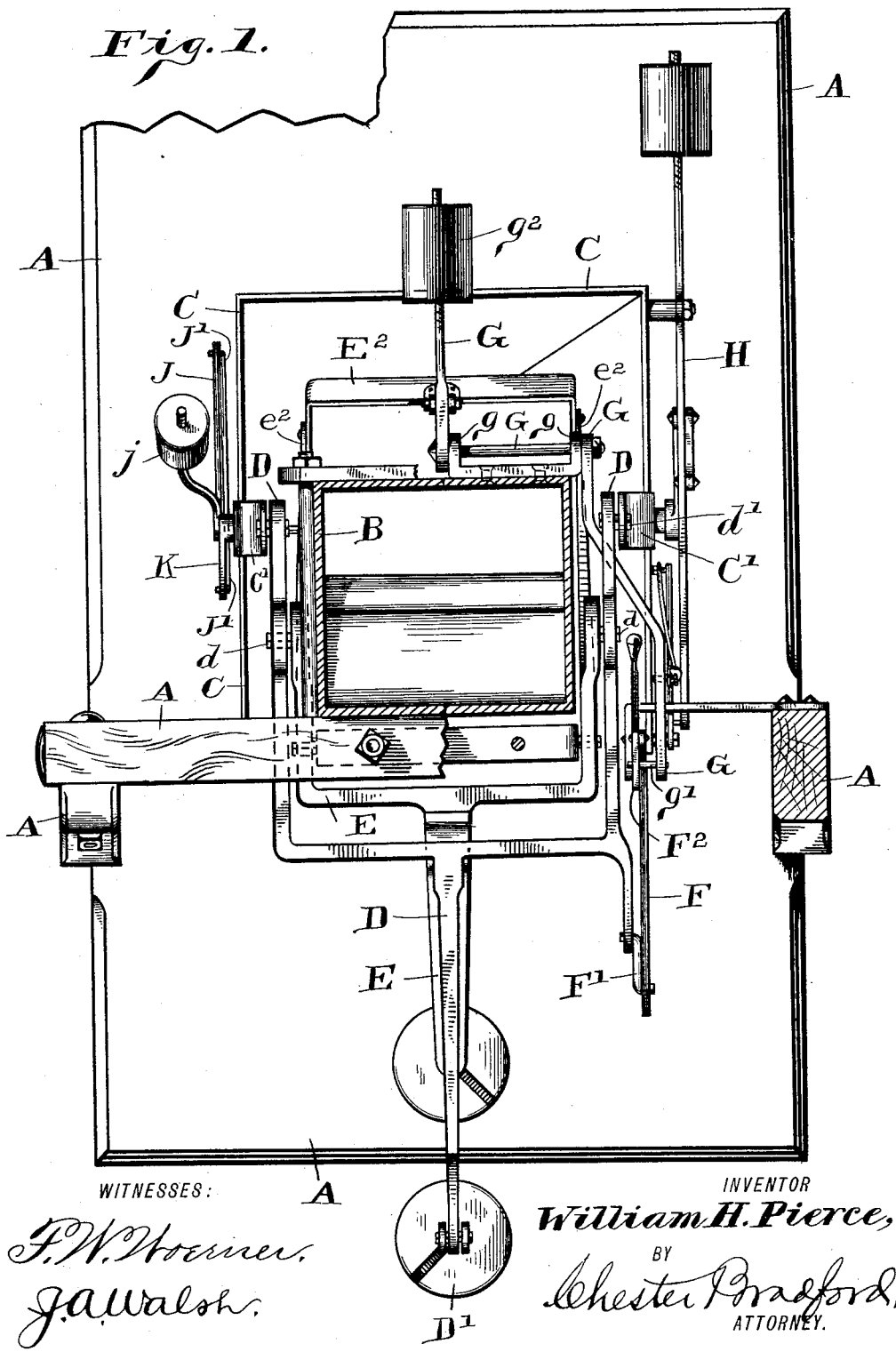
Figure 2:
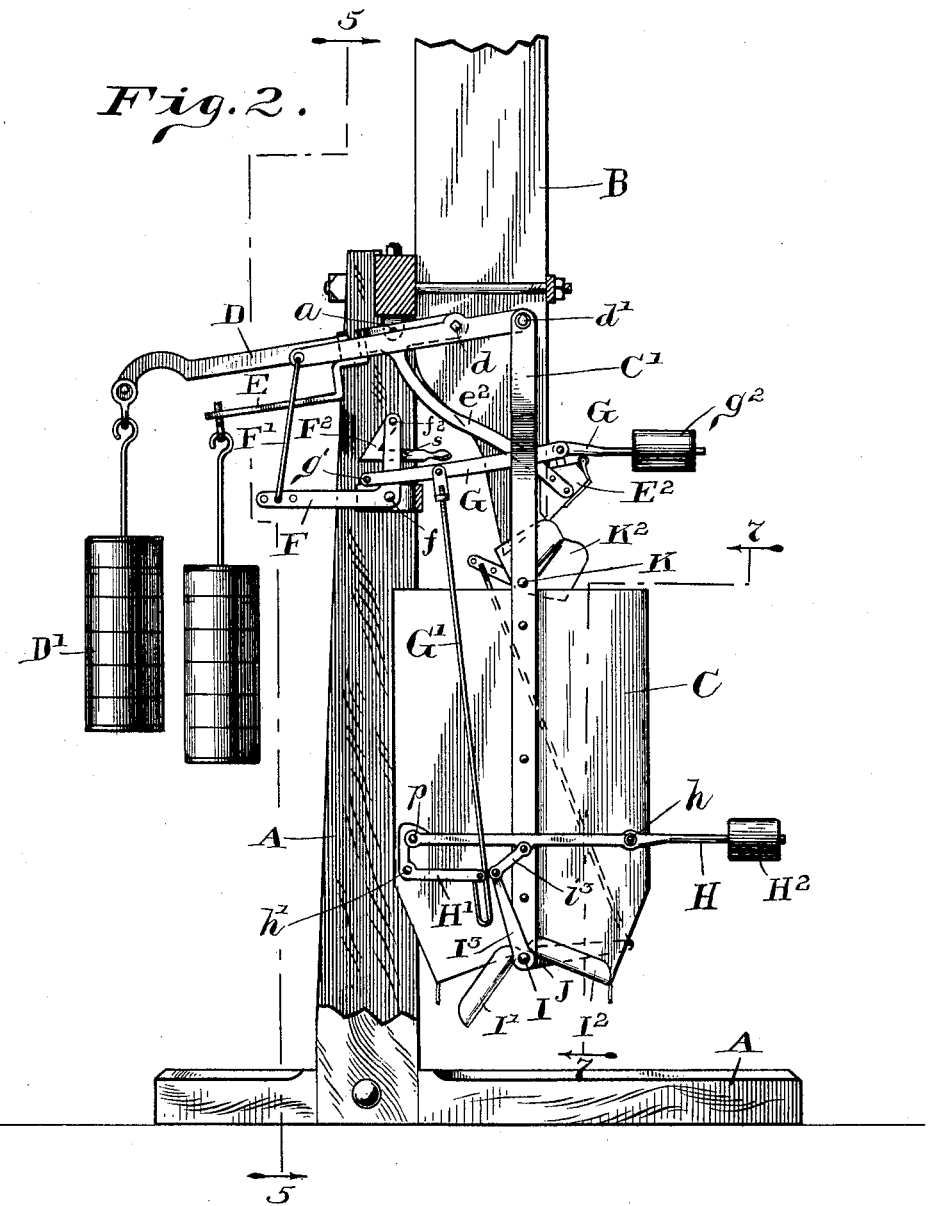
Figure 3:
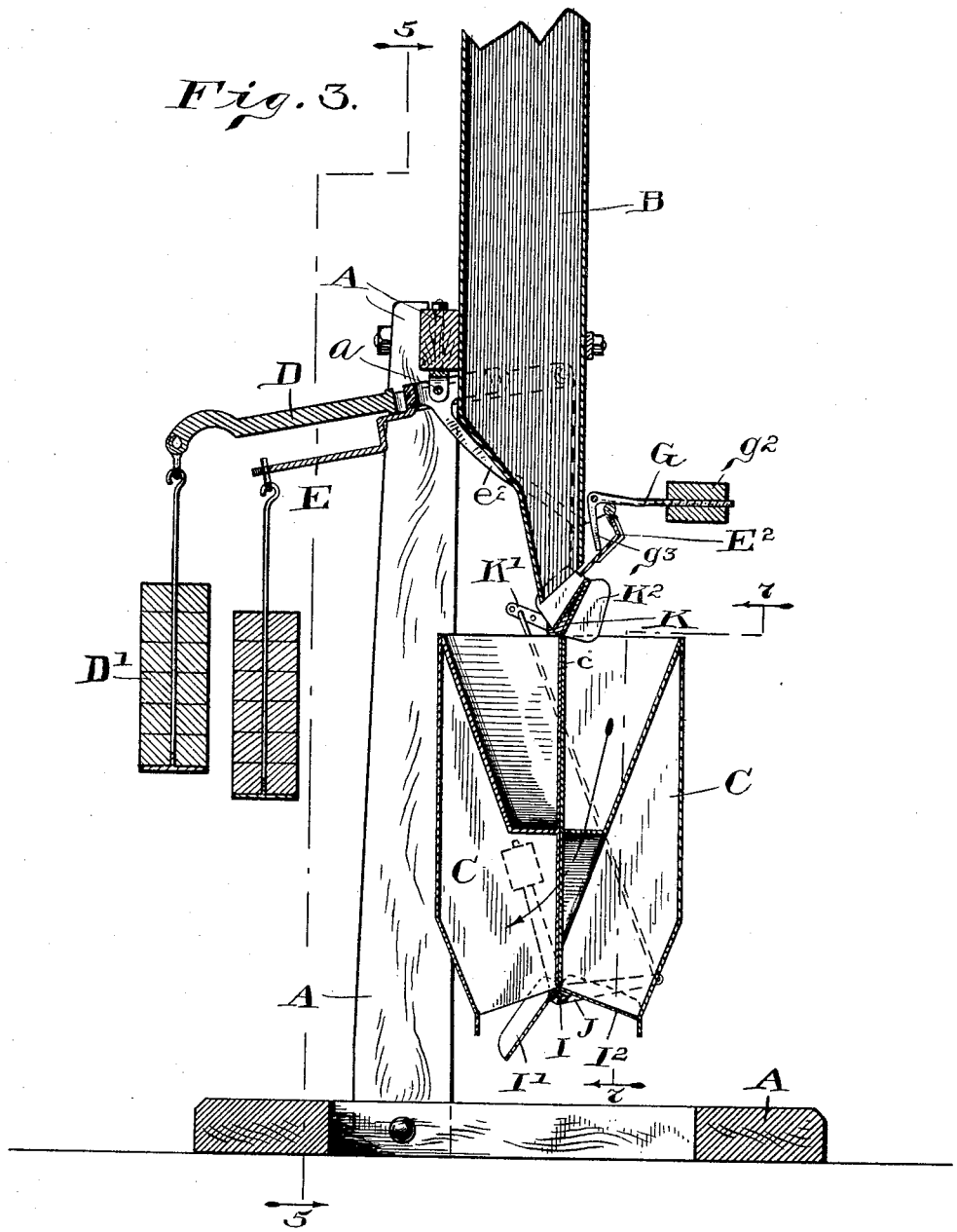

Referring to the accompanying drawings, which are made a part hereof and on which similar letters of reference indicate similar parts, Figure 1 is a top or plan view of an automatic weighing-machine embodying my various improvements; Fig. 2, a side elevation of the same, a portion of the framework being broken away to disclose the mechanism of the machine more clearly; Fig. 3, a central sectional view of said machine when looking in the same direction as in Fig. 2; Fig. 4, a side elevation of the opposite side of the machine; Fig. 5, a view as seen from the dotted line 5 5 in Figs. 2 and 3; Fig. 6, a horizontal sectional view of the weighing-hopper as seen from the dotted line 6 6 in Figs. 5 and 7; Fig. 7, a vertical sectional view of said weighing-hopper as seen from the dotted lines 7 7 in Figs. 2 and 3, and Fig. 8, a perspective view of said weighing-hopper.

In said drawings the portions marked A represent the framework of my improved machine; B, the inlet tube or chute whereby the grain or other material is conveyed to said machine to be weighed; C, the weighing-hopper; D, the main scale-beam; E, a second scale-beam or pivoted and weighted arm upon which the main scale-beam is supported and whereby the gates are operated or controlled; F, an arm carrying a pivoted catch and pivotally mounted on an arm on the frame A and operated from the scale-beam D; G, an arm pivoted in bearings on the chute B or some other convenient stationary part, one end of which is adapted to engage with the pivoted catch on the arm F and the other end of which is weighted and adapted to engage with and assist in operating the shut-off gate, as will be presently described; H, an arm pivoted to the weighing-hopper near its lower end; I, the shaft to the egress-gates to the weighing-hopper; J, an arm on the opposite end of said shaft, and K the shaft to the deflector or shifting guide, by which the material is directed into one compartment or the other of the weighing-hopper.

The framework A may be of any suitable or desired construction. It preferably consists of a base and two uprights with a cross-beam at the upper end, from which the mechanism of the machine is carried, and may of course have such cross-bars and braces as may be deemed desirable.

The inlet tube or chute B leads from the source of supply (not shown) of the material which is to be weighed, (such as a grain-bin in an elevator,) and its lower or discharging end is preferably fixedly secured to the frame A, so that the egress-opening in the extreme lower end of said tube or chute shall be immediately above the center of the weighing-hopper and adapted to discharge into either compartment of said hopper, according as the guide or deflector is in one position or the other, as will be presently described. The discharge or egress opening to this tube or chute is adapted to be closed by a suitable gate $E^2$, provided for the purpose and operated from the scale-beam E, as will be presently described.

The weighing-hopper C is of a peculiar construction, as best shown in Figs. 6, 7, and 8. It contains a series of internal partitions so arranged that the material, which enters it upon one side at the upper end, flows across to the opposite side at the lower end, so that when either compartment of said hopper is fully loaded the weight is distributed upon both sides of its center, the result being that it hangs in a substantially vertical position at all times, as well when one compartment only is filled with material as when both are filled or both empty. The advantage of this construction is obvious and insures an equal pull upon the scale-beam and an accurate positioning of the weighing-hopper in respect to the mouth of the tube or chute B at all times.

The scale-beam D is not in itself unusual in form or arrangement. It is carried by the ordinary knife-edge pivots $d$ from the rear end of the secondary scale-beam or arm E, and at its extreme carrying ends it is provided with other knife-edge pivots $d'$, by which through the suspension-bars C' the weighing-hopper C is carried. On its free end it carries the usual scale-weights D'. It operates in the usual and well-known manner, being raised by the load of the material in the weighing-hopper whenever said material reaches the predetermined quantity.

The secondary scale-beam E is carried from a pivot-shaft $a$, which latter is carried from the cross-beam of the framework. As heretofore stated, its rear ends carry the regular scale-beam D. From a suitable point arms $e^2$ on this beam extend downwardly and rearwardly, and said arms carry the cut-off gate $E^2$, by which the egress-opening to the tube or chute B is adapted to be closed. These scale-beams for the greater portion of their movement travel together, and the consequence is when the amount of material in the weighing-hopper reaches the predetermined quantity that the weights which are on said scale-beams are both overbalanced, and the hopper immediately descends the greater portion of the distance it travels in its operation. This nearly closes the shut-off gate $E^2$, so that the remaining flow of material is limited in quantity. At this point there is a momentary pause for reasons which will be presently explained, and the additional amount of material flows slowly to the weighing-hopper through the opening which has been thus diminished until the full amount of a load has been reached. When this additional quantity (which is sufficient to overcome the difference in leverage between the two scale-beams and raise the primary scale-beam slightly apart from the secondary scale-beam) has run in, then the mechanism which will be presently described is unlatched, the gate $E^2$ completely closes, the flow of material is entirely cut off, and the additional movements take place, which cause the load of grain to be discharged.

The pivoted arm F, as before stated, is carried by a suitable arm or projection on the frame A by means of a pivot $f$. It is connected to and operated by the main scale-beam D by means of a link F', which connects said arm and a suitable projection on said scale-beam. Pivoted to the other end of said arm, which is preferably in the form of a bell-crank lever, is the latch $F^2$, the pivot $f^2$ therefor being at the upper end of said arm. This latch is limited in its movement in one direction by a stop $s$, and it is normally held in said direction by its own gravity, but is free to be moved in the other direction by any force which may come against it. It is adapted during a certain portion of the movement of the scale mechanism to hold the pivoted arm G to a position which controls the gate $E^2$, as will be presently described.

The pivoted arm G is shown as formed of three pieces, but which are all rigidly connected together and are in effect integral. The central one of these pieces is in the form of a pivot-shaft and is shown as mounted in bearings $g$, the bearing structure being shown as rigidly secured to the inlet tube or chute B. Of course, however, said bearings could be carried from any other suitable rigid support which might be provided at or near this point. One member of said pivoted arm extends from one end of the central shaft-like portion to near the latch $F^2$ and has at or near its end a projection $g'$, which is adapted to engage with said latch. Another member extends in the other direction from the opposite end of the shaft-like central portion and bears upon its outer end a weight $g^2$, which is sufficient to overbalance that member which projects from the pivot-point in the other direction. As shown most plainly in Fig. 3, this member also has a downwardly-projecting arm $g^3$, which extends down into the gate structure $E^2$.

The arm H is pivoted at $h$ to the side of the weigher-hopper C, said pivot being near one side of said hopper. The long end of said arm extends toward the opposite side of said hopper and is there provided with a pin or projection $p$, which extends out therefrom at right angles and in a horizontal plane and is adapted to engage with a locking-catch H', which is also pivoted to the weighing-hopper C by the pivot $h'$ and is located adjacent to the normal position of the said end of the arm H. Upon the opposite end this arm H bears a counterpoise $H^2$, of sufficient weight to overbalance its longer end. The catch H' is in the form of a bell-crank lever, and its horizontal arm is provided also with a projection extending at right angles therewith and in a horizontal plane, which projection engages with a slot in the lower end of a connecting-rod G', carried from the pivoted arm G.

The shaft I carries rigidly attached thereto the two egress-gates I' and $I^2$ to the hopper C. Upon said shaft are also the two rigidly-connected arms $I^3$ and J, one at each end. The arm $I^3$ is connected by a short link $i^3$ and suitable pivots to the arm H, as best shown in Fig. 2. It is obvious that so long as the arm H is held by the latch H' the connection from said arm to the shaft I through the link $i^3$ and arm $I^3$ will act as a stay and hold said shaft I, and consequently the gates carried thereby, to the position shown. When, however, by the operation of the scale mechanism, as will be presently described, the catch H' becomes released, the weight of material in the hopper resting upon the gate $I^2$ will overbalance the weight $H^2$ and cause a shifting of positions, opening the gate $I^2$ and closing the gate I'. After this is done and when the latch H' returns to position the gate I' will be locked shut and the gate $I^2$ open, all as will be readily understood.

The arm J, as already stated, is rigidly connected to the opposite end of the shaft I from the mechanism just previously described. It is in the form of a bell-crank lever, and its free end carries a weight $j$. A connecting-rod J', running from the end of this arm J upwardly, connects with and is adapted to operate an arm K' on the end of the shaft K.

The shaft K extends across the upper side of the weighing-hopper C, just above the upper edge of the central partition $c$ therein. It carries rigidly connected thereto an arm K', by which it may be operated, and a deflector $K^2$, by which the flow of material from the ingress tube or chute B may be controlled and directed to either of the compartments of the weighing-hopper. When the hopper descends and the discharge-gate is released, the obvious result is that the position of this deflector is also shifted, and when the weighing-hopper reascends the upper edge of said deflector will be on the opposite side of the mouth of the ingress tube or chute B from that which it previously occupied. It will be observed that the weight $j$ occupies a position which enables it to accelerate the movement of the gates I' $I^2$ and deflector $K^2$ after motion has been imparted thereto by other means, thus insuring that these parts shall reach their final position in either direction by a quick movement and be there held by the force of this weight until the locking mechanism is enabled to properly engage.

The operation of my said invention may be stated or recapitulated as follows: Assume that the apparatus is employed in weighing grain, which is the use for which it is principally designed and in which it is mostly employed. The grain is caused to flow in through the inlet tube or chute B and is discharged from the lower end thereof into the weighing-hopper C, as will be clearly understood by a reference to the drawings, particularly Fig. 3. In said figure the parts are shown as so positioned that the flow of grain will enter that compartment of the hopper whose upper end is at the left, as can be seen in said figure. When nearly the predetermined quantity of grain has been thus introduced into said weighing-hopper, said hopper will descend a certain distance and the scale-beams D and E will travel upwardly in unison to a certain point. The scale-beam E during this movement will carry the shut-off gate $E^2$ to a position where the opening in the lower end of the inlet tube or chute B is nearly, but not completely, closed. Through the small orifice which remains after this operation grain will flow slowly and in a comparatively small quantity until the predetermined weight is fully reached, when the scale-beam D will be caused to move slightly, independently of the scale-beam E, on its pivot $d$. Meantime in the former operation the pivoted arm G has been moved, by means of its downwardly-projecting arm $g^3$, so that its pin $g'$ is in contact with the under side of the pivoted catch $F^2$. The further movement of the scale-beam D last above described so changes the relations of the parts that said pin $g'$ will escape from said pivoted catch, and when this takes place the scale-beam E instantly follows the scale-beam D to its extreme upward position, completely throwing the shut-off gate $E^2$ to its extreme closed position and completely stopping the flow of grain. At the same instant as the arm G ascends, being freed from the catch $F^2$, it operates through the rod G' to throw over the catch H', releasing the pivoted bar H, whereupon the weight of the grain itself in the weighing-hopper will force the egress-gate $I^2$ open, rocking the shaft I and closing the egress-gate I'. As soon as a small portion of the outflowing grain has been discharged the weighing-hopper of course becomes lightened, and as soon as this takes place it becomes overbalanced by the weights on the scale-beams and rises again to position and all the parts are set for a new operation. It should also be mentioned that the shaft I in rocking operates through the arm J, rod J', and arm K' to rock the shaft K, carrying the deflector $K^2$, so that when the discharge-orifice of the inlet tube or chute B is again opened the grain which flows therefrom is directed into the other compartment of the weighing-hopper.

It will be understood in the operation which has been above described, during the time the scale-beam D is being raised separately from the scale-beam E, that the latter is locked by means of the shut-off gate $E^2$, which is carried on the rigid arms $e^2$ on said scale-beam and the pivoted arm G, which engages with said shut-off gate at one end and is held at the other end by the pivoted catch $F^2$. This locking, however, is only momentary, the parts being so proportioned that a comparatively small additional weight on the weighing-hopper after both scale-beams are raised to the point indicated will operate to separate the scale-beams and release the lock, so that the weighing-hopper is permitted to descend.

Having thus fully described my said invention, what I claim as new, and desire to secure by Letters Patent, is—

1. The combination, with the weighing mechanism of an automatic weighing-machine, of a weighing-hopper divided by a central vertical partition into two compartments, each of which compartments is divided by an inclined transverse partition, said vertical partition being formed with an opening at each lower corner of the compartments above said transverse partitions, whereby the material received on one side of said vertical partition can flow through to beneath the transverse partition on its other side, and the weight of said material be thus distributed on both sides of the hopper at all times, substantially as set forth.

2. The combination, in an automatic weighing-machine, of an ingress tube or chute, a weighing-hopper, a main scale-beam to which the weighing-hopper is suspended, a secondary scale-beam upon which the main scale-beam is carried, and a shut-off gate to the ingress tube or chute carried by said secondary scale-beam.

3. The combination, in an automatic weighing-machine, of the ingress tube or chute, the weighing-hopper, a main scale-beam by which said weighing-hopper is carried, a secondary scale-beam which carries said main scale-beam, and also a shut-off gate to the ingress tube or chute, a pivoted arm mounted on the framework and connected by a link to the main scale-beam and carrying a pivoted catch, a pivoted bar carried from a fixed point and provided with a projection adapted to come in contact with said pivoted catch at one end and provided with an arm which extends from at or near its pivot-point into the path of the shut-off gate, whereby, when the weighing-hopper is nearly filled, both scale-beams will be first raised to a certain position, the secondary scale-beam there momentarily stopped, the shut-off gate being meantime nearly closed until additional material is discharged into the weighing-hopper, when the main scale-beam will be raised independently of the secondary scale-beam and the shut-off gate entirely closed, substantially as set forth.

4. The combination, in an automatic weighing-machine, of the frame, the main scale-beam carried on the secondary scale-beam, said secondary scale-beam mounted on a pivot-shaft mounted on the frame, the inlet-chute, the cut-off gate $E^2$ thereto carried on arms extending out from said secondary scale-beam, a divided weighing-hopper, a shifting deflector at the top thereof under the discharge end of said chute, means for operating it to direct the flow to one or the other division of said hopper, discharge-gates at the bottom of said hopper, and means for operating them, all substantially as described and for the purposes set forth.

5. The combination, in an automatic weighing-machine, with a weighing-hopper divided into compartments, of a rock-shaft at the upper end thereof carrying a deflector, a rock-shaft at the lower end thereof carrying the discharge-gates to the two compartments, a connection between said two shafts whereby said deflector and said gates are simultaneously shifted, a locking mechanism carried by the hopper and connected to the lower rocking shaft, and a connection between said locking mechanism and the weighing mechanism at the upper end of the machine, whereby, as the weighing-hopper descends, said rocking mechanism is unlocked and the gates and the deflector permitted to shift position, being operated thereto by the weight of the grain in the filled compartment of the weighing-hopper, substantially as set forth.

6. The combination, in an automatic grain-weighing machine, of the ingress-chute, the weighing-hopper, the main scale-beam, a secondary scale-beam pivoted upon the frame and carrying the pivots on which said main scale-beam is mounted, a cut-off gate to said chute carried by said secondary scale-beam, a connection between said gate and a pivoted lock arranged to arrest the movement of said secondary scale-beam momentarily at a certain point in the operation, and a connection with said pivoted lock and the main scale-beam arranged to release said parts and permit the further movement of said secondary scale-beam after said momentary pause, all substantially as set forth.

7. The combination, in an automatic weighing-machine, with the double-compartment weighing-hopper, a rock-shaft secured centrally below said hopper and carrying both discharge-gates, a locking mechanism mounted on the side of said hopper whereby said shaft may be locked in either position and either gate thus locked shut, and a connection therefrom to parts operated by the scale-beam, whereby, when the hopper is filled, the locking mechanism may be unlocked and the gates permitted to shift position, substantially as set forth.

8. The combination, in an automatic weighing-machine, of the ingress tube or chute, the weighing-hopper, the main scale-beam, a secondary scale-beam carrying the shut-off gate to the ingress-tube, a pivoted bar G having an arm which extends into said shut-off gate and which is thus operated thereby, a catch for holding said bar at one end, a connection from said catch to the main scale-beam, and a counterpoise at the other end of said bar, substantially as set forth.

In witness whereof I have hereunto set my hand and seal, at Tolono, Illinois, this 22d day of October, A. D. 1897.

WILLIAM H. PIERCE. [L. S.]

Witnesses:
THOS. MAGUIRE,
HARRY W. RILEY.